Dec. 1, 1936.  T. J. TUREK  2,062,485
STEERING MECHANISM
Filed Dec. 19, 1934
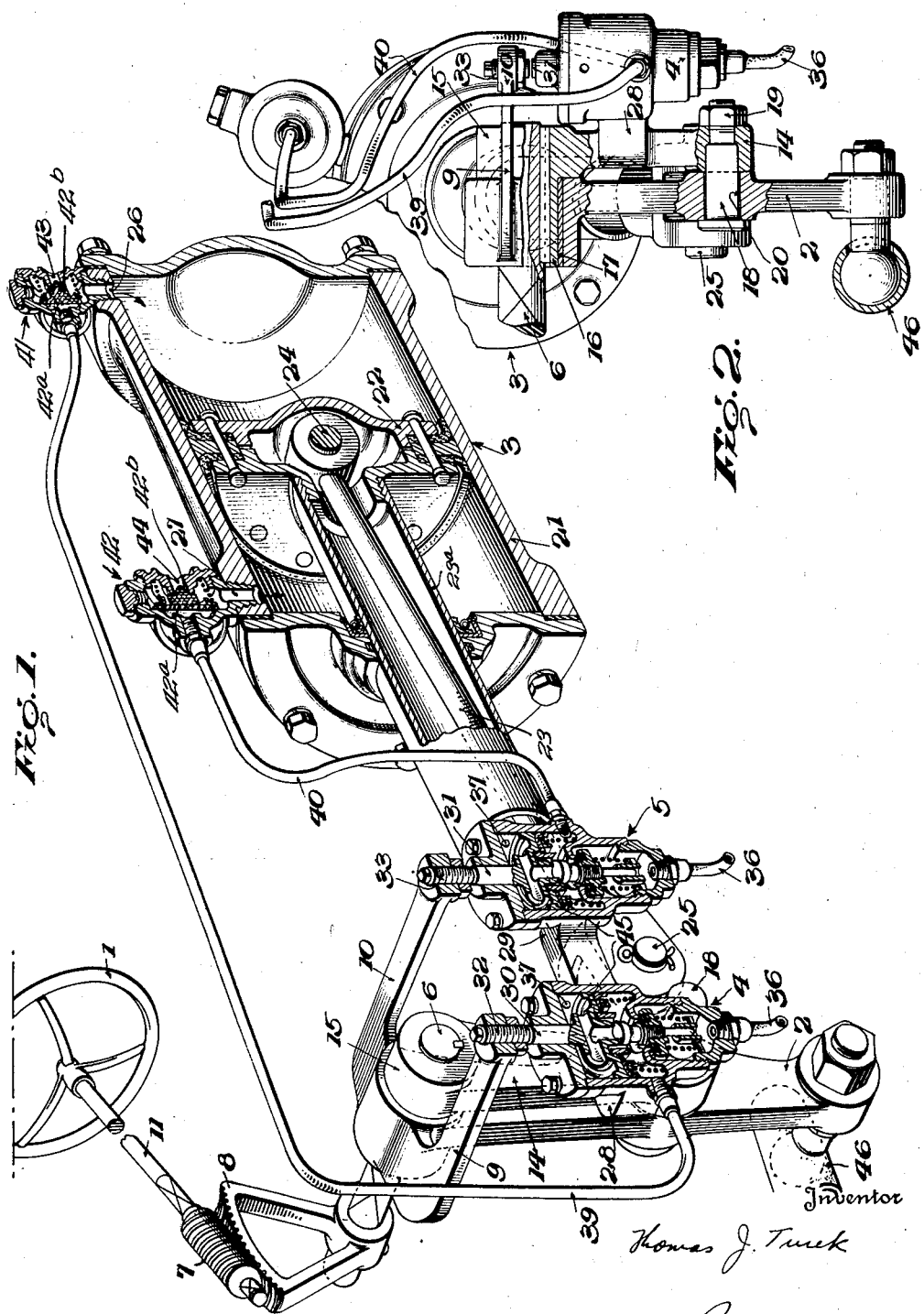

Patented Dec. 1, 1936

2,062,485

UNITED STATES PATENT OFFICE 2,062,485

STEERING MECHANISM

Thomas J. Turek, Pittsburgh, Pa., assignor to Bendix-Westinghouse Automotive Air Brake Company, Pittsburgh, Pa., a corporation of Delaware Application December 19, 1934, Serial No. 758,328

7 Claims. (Cl. 180—79.2)

This invention relates to power steering apparatus, and more particularly, to power steering apparatus for automotive vehicles having dirigible wheels.

It is an object of the present invention to provide a novel power steering apparatus of the above type which may be efficiently operated by means of fluid pressure.

Another object is to provide a novel power steering apparatus having a manually-operable control device provided with means for resisting manual operation with a force proportional to the resistance being offered to the power steering apparatus, whereby a reaction or feel will be produced in the manually-operable means so as to simulate the action of the conventional steering gear.

A further object is to produce the above described feel or reaction by means of reactive valves bodily movable with, and interposed between, the manually-operable control means and the power steering apparatus.

A still further object is to provide novel manually-operable means for bodily moving the reactive valves so as to actuate the valves by engagement with the power steering means.

Still another object is to provide a novel light weight power steering apparatus involving relatively few parts, and constructed in such a manner as to be capable of ready installation upon existing types of steering gears.

The above and other novel features of the invention will appear more fully hereinafter from the following detailed description when taken in connection with the accompanying drawing, wherein one embodiment of the invention is illustrated. It is to be expressly understood, however, that the drawing is for purposes of illustration only and is not designed as a definition of the limits of the invention, reference being had for this purpose to the appended claims.

In the drawing, wherein similar reference characters denote similar parts throughout the several views:

Fig. 1 is a perspective view, partly in section, of a power steering apparatus constructed in accordance with the present invention, and Fig. 2 is an end view, partly in section, of a portion of the apparatus shown in Fig. 1.

Referring to the drawing, the present invention is illustrated therein as applied to a steering gear comprising a manually-operable steering wheel 1, a pitman arm 2 of the steering mechanism of a vehicle, and a pneumatic motor 3 which acts upon the pitman arm 2 to cause the pitman arm to follow every movement of the steering wheel. Pneumatic pressure is applied to the motor to cause this follow-up movement by means of valves 4 and 5 secured to a shaft 6 which is rocked by any movement of the steering wheel 1 by means of the worm 7 and sector 8, these valves 4 and 5 engaging suitable actuating members carried by the pitman arm 2, the latter being journaled for independent rotation with respect to the shaft 6. Any angular displacement of the shaft 6 with respect to the arm 2 will cause actuation of one of the valves 4 or 5 and admit pneumatic pressure to the motor in such a way as to shift the arm 2 to realign the arm with the shaft 6. As will appear more fully hereinafter, the valves 4 and 5 are of a reactive type and resist actuation by the steering wheel 1 and shaft 6 with a force proportional to the force exerted by the pneumatic motor, which resisting force is felt by the driver and apprises him of the steering effort being employed.

More particularly to describe the connections between the steering wheel 1 and the power operated means, the steering wheel is secured to the upper end of a steering shaft 11, through which it operates the worm 7 and sector 8. The sector 8 in turn rocks a valve-carrying arm 14 by means of the shaft 6 suitably secured to the sector 8 at one end and to the arm 14 at the other. The hub 15 of the arm 14 has a sleeve 16 formed integrally therewith and extending to the left in Fig. 2 coaxially with the shaft 6, the sleeve serving as a trunnion upon which the pitman arm 2 is journaled by means of an anti-friction bushing 17, the construction being such that the pitman arm 2 and the valve-carrying arm 14 are capable of angular motion with respect to one another. This angular motion is limited by means of a pin 18 secured to the arm 14 at 19 and extending into an enlarged opening 20 formed in the pitman arm 2 intermediate its ends, thus providing a lost motion connection between the manually-operable arm 14 and the pitman arm. In the event that the power means heretofore referred to fails to cause the pitman arm to follow the motion of the shaft 6, the lost motion connection 18, 20 will be taken up, providing a direct mechanical connection between the steering shaft 11 and the pitman arm 2 so as to enable positive actuation of the latter by means of manual power.

The pneumatic motor 3 more particularly includes a double-acting cylinder 21 housing a piston 22 connected to the pitman arm 2 by means of a connecting rod 23, the latter being pivotally secured to the piston by means of the wrist pin 24 and to the pitman arm 2 by means of a pin 25. Since the connecting rod partakes of lateral movement with respect to the cylinder, a fluid-tight fit between the piston and the head of the cylinder is obtained by employing a sleeve 23a, secured to the piston and loosely surrounding the rod. Admission of fluid pressure to the right hand end of the cylinder through port 26 thrusts the piston to the left, and rocks the pitman arm in a clockwise direction, while admission of fluid pressure to the left hand end of the cylinder through port 27 will rock the pitman arm in a counterclockwise direction.

Means are provided whereby any angular displacement of the shaft 6 with respect to the pitman arm 2 will cause the admission of fluid power to the cylinder 21 in such a manner as to cause power operation of the pitman arm 2 and to cause the latter to follow up the motion of the said shaft 6. As shown, such means include the reactive valves 4 and 5 carried on arms 28 and 29 formed integrally with the arm 14, the stems 30 and 31 of these valves being operated by abutment with adjustable studs 32 and 33 carried on a pair of arms 9 and 10 integrally with the pitman arm 2.

The reactive valves 4 and 5 are of well known construction and may be of the form shown in the patent to Stephen Vorech et al. No. 2,018,197, dated October 22, 1935. Briefly, these valves include a flexible supply conduit 36 connected to a source of fluid pressure, exhaust ports 37, flexible outlet conduits 39 and 40 for transmitting pressure to the cylinder 3, and controlling stems 30 and 31 for actuating the valves. Downward force upon the controlling stems will cause each valve to admit fluid pressure from the supply conduit 36 to the outlet conduit, and release of the stem will cause the valve to exhaust the conduit 39 or 40 through the exhaust ports 37. Any downward actuating force upon the valve stem 30 or 31 will be resisted with a force proportional to the pressure in the outlet conduit, since this outlet pressure acts upon the lower face of a reactor piston 45 secured to each valve stem.

The flexible outlet conduits 39 and 40 of the valves 4 and 5 are connected respectively to the right and left hand ends of the cylinder 1 through quick release valves 41 and 42. These quick release valves are of well known construction and include diaphragms 42a, the peripheral portions of which function as inlet valves for controlling the flow of fluid pressure through conduits 26 and 27 to the cylinder 3. The diaphragms are formed with central exhaust portions 42b which normally close exhaust ports 43 and 44 when the diaphragms are subjected to fluid pressure through conduits 39 and 40. However, when these last named conduits are exhausted, the fluid pressure within the cylinder is exerted against the diaphragms to move the central portions thereof to the left, as viewed in Fig. 1, whereupon portions 42b will be moved to uncover the exhaust ports and quickly exhaust the cylinder.

In operation, assuming that the driver of the vehicle to which the steering mechanism is applied desires to steer to the right, steering wheel 1 is rotated in such a direction as to move the arm 14 in a counterclockwise direction, thus swinging the valve 5 bodily so that its stem 31 abuts the stud 33, thus depressing the stem. This effects operation of the valve 5 to admit pneumatic pressure to the left hand port 27 of the cylinder 21, causing the piston 22 to move to the right to rock the pitman arm 2 in a counterclockwise direction following the motion of the arm 14. In so rotating, the pitman arm 2 pulls the drag-link 46 rearwardly, steering the vehicle to the right. The extent of this steering movement depends on the extent to which the driver turns the steering wheel 1, for, assuming that the driver stops turning the wheel 1, the arm 14 will come to rest and the pitman arm 2 and its branch arm 10, in their counterclockwise motion, will withdraw the stud 33 from the stem 31 of the valve 5, allowing the latter to exhaust the conduit 40. This exhausting of the conduit 40 causes the quick release valve 42 to exhaust the left hand end of the cylinder 1, and the motion of the pitman arm 2 will accordingly cease, the pitman arm being once more in alignment with the arm 14.

During the above operation, a reaction or "feel" is reflected to the manual steering mechanism, which will apprise the driver, at any instant, of the force which the piston 22 exerts upon the pitman arm 2. This feel is produced by the reaction of the stem 31 of the valve 5 against the arm 10 on the pitman arm 2, which imparts a clockwise torque upon the arm 14 which is felt by the driver as opposing the operation of the wheel 1. As was hereinbefore mentioned, this force is proportional to the pressure in the conduit 40, and consequently to the force exerted by the piston 22.

Conversely, if the driver desires to steer to the left, the steering wheel is moved in the opposite direction, effecting operation of valve 4. The valve stem 30 in this case is thrust against the stud 32, fluid pressure passes into the right hand port 26 of the cylinder 21 and the pitman arm 2 is rotated clockwise to steer the vehicle to the left. As before, the reaction of the valve stem 30 applies a resisting torque to the operation of the manual control means proportionate to the force being exerted by the pneumatic steering means.

There is thus provided by the present invention a power steering mechanism wherein the force exerted by the power steering mechanism is proportionately reflected back to the manual control member so as to apprise the driver of the resistance to the steering action, and wherein the pneumatic control valves are carried directly on a manually-controlled member with consequent simplicity of construction.

While only one embodiment of the invention has been illustrated and described, it is to be understood that the invention is not limited thereto, but may be capable of being employed in other forms as well understood by those skilled in the art. Furthermore, the parts disclosed herein may be rearranged, if desired, and certain of the parts used without others without departing from the spirit of the invention. Reference will, therefore, be had to the appended claims for a definition of the limits of the invention.

What is claimed is:

1. In a power-operated steering mechanism, a manually-rotatable shaft, a pitman arm rotatably mounted thereon, a lever secured to said shaft and operatively associated at one end through a lost motion connection with said arm intermediate the ends of the latter, a fluid motor having a movable element connected with said arm, and reactive valve means carried by said lever and operable during movement of said lever with respect to said arm to control the flow of fluid to said motor.

2. In a power-operated steering mechanism, a manually-rotatable shaft, a pitman arm rotatably mounted thereon, a lever secured to said shaft and operatively associated at one end through a lost motion connection with said arm intermediate the ends of the latter, a fluid motor having a movable element connected with said arm, reactive valve means including a casing carried by said lever, and a movable valve element in said casing, engageable with a portion of said arm during movement of said lever with respect to said arm for actuating said valve means to control the flow of fluid to said motor.

3. In a power-operated steering mechanism, a manually-rotatable shaft, a pitman arm rotatably mouted thereon, a lever secured to said shaft and operatively associated at one end through a lost motion connection with said arm intermediate the ends of the latter, a fluid motor having a movable element connected with said arm, and reactive valve means including cooperating parts carried by said arm and lever and operable during movement of said lever with respect to said arm to control the flow of fluid to said motor.

4. The combination, with a steering member of a vehicle, a fluid motor for operating said steering member and a manually-operable control member therefor movable independently of said steering member and said fluid motor, of reactive valve means carried by said manually-operable member and engageable with said steering member upon actuation of the manually-operable member to control the flow of fluid to said motor, and means for limiting the independent movement of the manually-operable control member with respect to the steering member.

5. The combination, with a steering member of a vehicle, a fluid motor for operating said steering member in reverse directions and a manually-operable control member therefor movable independently of said steering member and motor, of a pair of reactive valves carried by said manually-operable member and engageable with the steering member upon actuation of the manually-operated member, each adapted to be opened when engaged with the steering member, to admit fluid to said motor to operate said steering member in one direction, and means for limiting the independent movement of the manually-operable control member with respect to the steering member.

6. The combination, with a steering member of a vehicle, a pneumatic motor for operating said steering member in reverse directions, and a manually-operable control member therefor movable independently of said steering member and motor a limited amount, of a pair of reactive valves including casings carried by said manually-operable member, each of said valves adapted when operated to admit fluid to said pneumatic motor to operate said steering gear in one direction, and quick release valve means adjacent said fluid motor for exhausting said motor whenever said reactive valves are moved to exhaust position.

7. The combination, with a steering member of a vehicle, a main motor for operating said steering member and a manually-operable control member therefor mounted for limited independent movement with respect to said steering member and said motor, of control means carried by said manually-operable member, engageable with said steering member during limited independent movement of said manually-operable member with respect to said steering member and adapted, upon said engagement, to energize said motor, and a subordinate motor associated with said control means, and carried by said manually-operable member for reacting upon said manually-operable member with a force proportional to the energy transmitted to said main motor.

THOMAS J. TUREK.